US007990250B2

(12) United States Patent
Hanahara et al.

(10) Patent No.: US 7,990,250 B2
(45) Date of Patent: Aug. 2, 2011

(54) REMOTE CONTROL TRANSMITTER AND TRANSMITTING-RECEIVING SYSTEM

(75) Inventors: Tetsuro Hanahara, Fukui (JP); Noriaki Matsui, Fukui (JP)

(73) Assignee: Panasonic Corporation, Osaka (JP)

( * ) Notice: Subject to any disclaimer, the term of this patent is extended or adjusted under 35 U.S.C. 154(b) by 1000 days.

(21) Appl. No.: 11/680,124

(22) Filed: Feb. 28, 2007

(65) Prior Publication Data

US 2007/0205911 A1 Sep. 6, 2007

(30) Foreign Application Priority Data

Mar. 6, 2006 (JP) ................................ 2006-059130

(51) Int. Cl.

| | |
|---|---|
| ***G05B 11/01*** | (2006.01) |
| ***G08B 1/08*** | (2006.01) |
| ***G08B 13/14*** | (2006.01) |
| ***H04L 17/02*** | (2006.01) |
| ***H04J 3/06*** | (2006.01) |
| ***G09B 3/00*** | (2006.01) |
| ***G06F 19/00*** | (2006.01) |

(52) U.S. Cl. ............ 340/12.22; 340/539.14; 340/572.2; 340/679; 340/680; 341/176; 370/519; 434/351; 463/39

(58) Field of Classification Search ....................... None
See application file for complete search history.

(56) References Cited

U.S. PATENT DOCUMENTS

| | | | | |
|---|---|---|---|---|
| 6,134,248 | A * | 10/2000 | Kawasaki et al. | 370/519 |
| 6,760,308 | B1 * | 7/2004 | Ghanma et al. | 370/235 |
| 7,154,410 | B2 * | 12/2006 | Hoermann | 340/825.73 |
| 7,719,981 | B2 * | 5/2010 | Ghanma et al. | 370/235 |
| 2002/0003467 | A1 * | 1/2002 | Musschebroeck et al. | 340/3.41 |
| 2004/0227656 | A1 * | 11/2004 | Asakura et al. | 341/176 |

FOREIGN PATENT DOCUMENTS

| | | | |
|---|---|---|---|
| JP | 03-277097 | A | 12/1991 |
| JP | 07-008631 | A | 1/1995 |
| JP | 10-98787 | A | 4/1998 |
| JP | 2000-069579 | A | 3/2000 |
| JP | 2004-096562 | A | 3/2004 |

OTHER PUBLICATIONS

Japan Office Action for Application No. 2006-059130, Jan. 11, 2011, Panasonic Corporation.

* cited by examiner

*Primary Examiner* — Jennifer Mehmood
*Assistant Examiner* — Fekadeselassie Girma
(74) *Attorney, Agent, or Firm* — RatnerPrestia

(57) ABSTRACT

A remote control transmitting and receiving system for operating electric equipment with little operational misjudgment or malfunction. By setting a plurality of transmission codes of remote control signals of a plurality of remote control transmitters to different periods and by providing transmission order data in these transmission codes, even if transmission is carried out from a plurality of remote control transmitters completely simultaneously or with a slight time difference, it is possible to judge the transmission operation order accurately.

8 Claims, 8 Drawing Sheets

REMOTE CONTROL TRANSMITTER AND TRANSMITTING-RECEIVING SYSTEM

BACKGROUND OF THE INVENTION

1. Field of the Invention

The present invention relates to a remote control transmitter used mainly for operating various electronic equipment and a transmitting-receiving system using the remote control transmitter.

2. Background Art

Recently, remote controlling of various equipment such as video, audio and air conditioning equipment has been widely carried out by using a remote control transmitter. In particular, in a game machine, or the like, a plurality of persons often operate one equipment by using their respective remote control transmitters. Therefore, remote control transmitters with little operational misjudgment or malfunction have been demanded.

Such a conventional remote control transmitter and a transmitting-receiving system using the same are described with reference to FIGS. 6 to 9. FIG. 6 is an overall view showing a conventional transmitting-receiving system. Remote control transmitter 1 shown in FIG. 6 has the following configuration. Remote control transmitter 1 includes substantially box-shaped case 1A made of an insulating resin; a plurality of operation keys 1B protruding on the upper surface of case 1A; switch contacts (not shown) provided in case 1A, which allow electrical connection and disconnection by the operation of operation keys 1B; and built-in controlling means 1C such as a microcomputer and a light emitting diode for transmitting a remote control signal corresponding to the operation. Receiver 5 shown in FIG. 6 includes, in the front surface thereof, display section 5S such as a liquid crystal display device and receiving section 5D such as a microcomputer. A transmitting-receiving system is configured by receiver 5, remote control transmitter 1, and a plurality of remote control transmitters 2 and 3 formed in the same manner as in remote control transmitter 1.

In the above-mentioned configuration, the first case of an operation example is described. In the first case, for example, a plurality of persons play a game such as a quiz game. When a question of the quiz is displayed on display section 5S of receiver 5, a person having remote control transmitter 1 presses operation key 1B for answering the question, control means 1C detects this and transmits an infrared ray remote control signal to receiver 5. Signal waveform 7A in FIG. 7 shows a change over time of a transmit signal waveform. In signal waveform 7A in FIG. 7, transmission codes V1 are arranged in a predetermined period X1.

As shown in a waveform diagram of a transmission code shown in FIG. 8A, transmission code V1 of the remote control signal includes, in detail, header data VA shown in FIG. 8B, operation key data VB of "0010" being unique to the pressed operation key and including a combination of "0" in FIG. 8C and "1" in FIG. 8D, remote control identification data VC1 of "0001" for identifying individual remote control transmitters, and stop bit data VD shown in FIG. 8E.

At this time, when another person having remote control transmitter 2 presses an operation key for answering the question slightly later, the remote control signal is transmitted as shown in signal waveform 7B in FIG. 7. The remote control signal is transmitted from remote control transmitter 2 to receiver 5. The remote control signal has transmission codes V2 arranged in period X2 that is larger than period X1. At this time, in transmission code V2, header data VA, operation key data VB and stop bit data VD are the same as those of transmission code V1. Only the remote control identification data are different from remote control identification data VC1 of remote control transmitter 1.

Receiver 5 receives two remote control signals from remote control transmitters 1 and 2. Since the first transmission code V1 of signal waveform 7A and the first transmission code V2 of signal waveform 7B are received almost simultaneously and data are superimposed on each other, receiver 5 cannot decode them. Then, however, when the receiver receives the second transmission code V1 of signal waveform 7A in FIG. 7 from remote control transmitter 1 after period X1 and thereafter receives the second transmission code V2 of signal waveform 7B in FIG. 7 from remote control transmitter 2 after period X2, the receiver receives individual transmission codes separately because there is a difference between period X1 and period X2. Therefore, receiver 5 can decode a remote controller that transmitted each signal. Then, receiver 5 judges that remote control transmitter 1 is operated earlier than remote control transmitter 2 because it decodes a signal from remote control transmitter 1 firstly. Then, for example, in a game, a point is given to a person having remote control transmitter 1.

Then, the second case of an operation example is described. FIG. 9 shows a change over time of a signal waveform when remote control transmitter 2 is operated slightly earlier than remote control transmitter 1. When signal waveform 9A of remote control transmitter 1 and signal waveform 9B of remote control transmitter 2 are compared with each other, first transmit codes V1 and V2 of remote control transmitters 1 and 2 are superimposed on each other. Therefore, receiver 5 cannot decode them. However, second transmission codes V1 and V2 are not superimposed on each other. Therefore, receiver 5 can decode them. Then, receiver 5 makes a comparison on the orders of transmission operation of both signals. Also at this time, receiver 5 judges that remote control transmitter 1 is operated earlier than remote control transmitter 2 because receiver 5 decodes a signal from remote control transmitter 1 firstly. That is to say, a conventional transmitting-receiving system makes misjudgment and malfunction, that is, it judges that remote control transmitter 2 is operated later although remote control transmitter 2 is operated slightly earlier.

An example of prior art information related to the invention of this application includes Japanese Patent Application Unexamined Publication No. 10-98787. As described in the above, a remote control transmitter and a transmitting-receiving system according to a conventional technology tend to cause misjudgment or malfunction when a plurality of remote control transmitters are operated simultaneously or operated with a slight time difference.

SUMMARY OF THE INVENTION

The present invention provides a remote control transmitter including transmission order data in a plurality of transmission codes of a remote control signal. Code transmission order data showing an ordinal position of each code are provided in a plurality of transmission codes arranged in a predetermined period. Thus, when a transmitting-receiving system is configured by a plurality of remote control transmitters and a receiver, even if signals are transmitted from a plurality of remote control transmitters simultaneously or with a slight time difference, it is possible to judge the order of transmission operations accurately. In order words, it is possible to obtain a remote control transmitter with little operational misjudgment or malfunction.

DETAILED DESCRIPTION OF THE INVENTION

Figure 1:
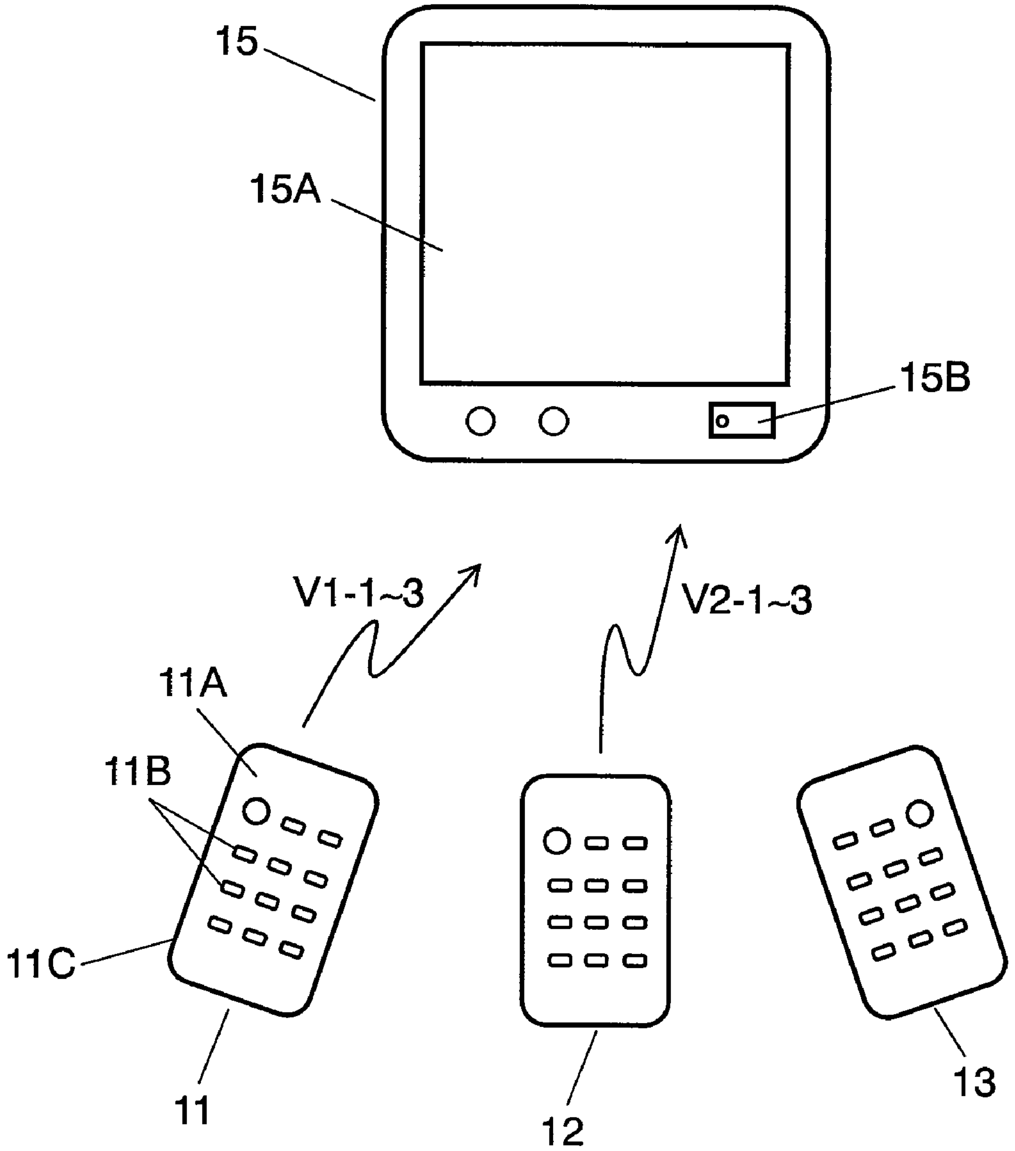
FIG. 1 is an overall view showing a transmitting-receiving system in accordance with an embodiment of the present invention.

Hereinafter, an embodiment of the present invention is described with reference to FIGS. 1 to 5. The same reference numerals are given to the same configurations as those described in the background art and detail description thereof is simplified.

Embodiment

FIG. 1 is an overall view showing a transmitting-receiving system in accordance with an embodiment of the present invention. In FIG. 1, remote control transmitter 11 includes substantially box-shaped case 11A made of an insulating resin; a plurality of operation keys 11B protruding on the surface of case 11A; switch contacts (not shown) for carrying out electrical connection and disconnection by the operation of case operation keys 11B; and controlling means 11C such as a microcomputer and a light emitting diode for transmitting a remote control signal corresponding to the operation. Receiver 15 includes, in the front surface thereof, display section 15A such as a liquid crystal display device and receiving section 15B such as a microcomputer. A transmitting-receiving system is configured by receiver 15, remote control transmitter 11, and a plurality of remote control transmitters 12 and 13 formed in the same manner as in remote control transmitter 11.

Figure 2:
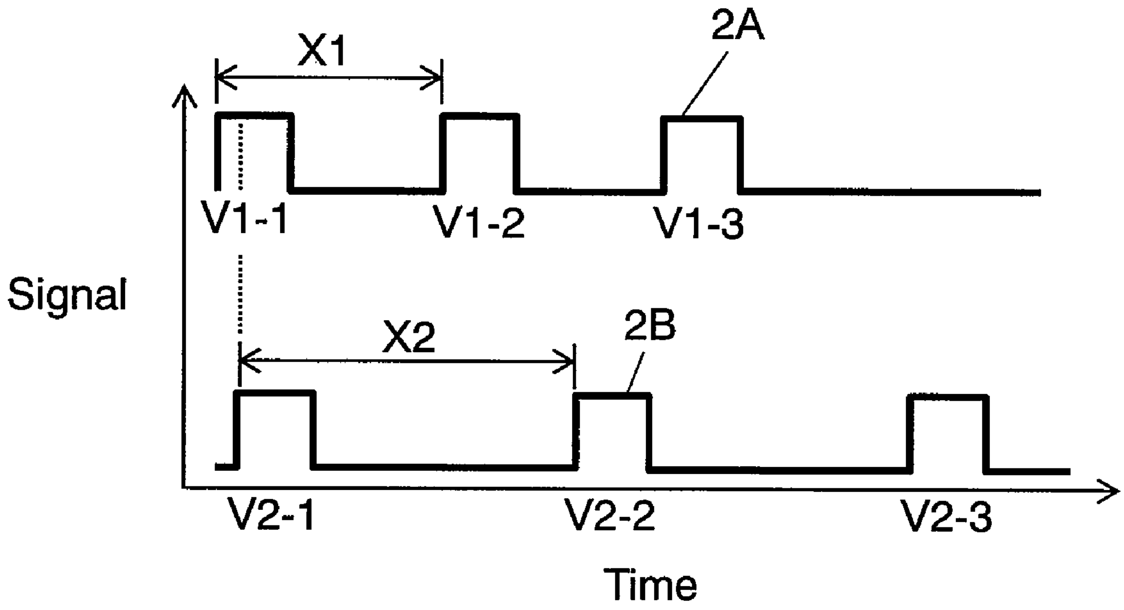
FIG. 2 is a waveform diagram of a remote control signal of a remote control transmitter of FIG. 1 in the first case.

In the above-mentioned configuration, the first case is described. In the first case, a plurality of persons play a game such as a quiz game. In a state in which a question of the quiz is displayed on display section 15A of receiver 15, when a person having remote control transmitter 11 presses operation key 11B for answering the question, control means 11C detects this and transmits an infrared ray remote control signal to receiver 15. Reference numeral 2A of FIG. 2 shows a change over time of a signal waveform of the transmitted remote control signal. In 2A of FIG. 2, transmission codes V1-1, V1-2, and V1-3 are arranged in a predetermined period X1.

Figure 3A:
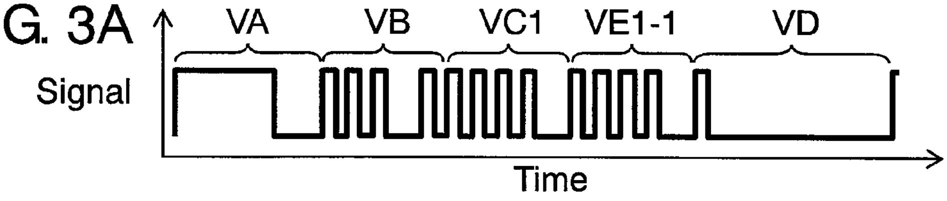
FIGS. 3A to 3G are waveform diagrams of transmission codes in the remote control transmitter of FIG. 1.
Figure 3B:
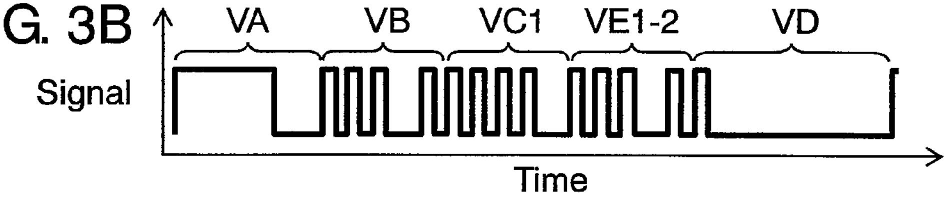
Figure 3C:
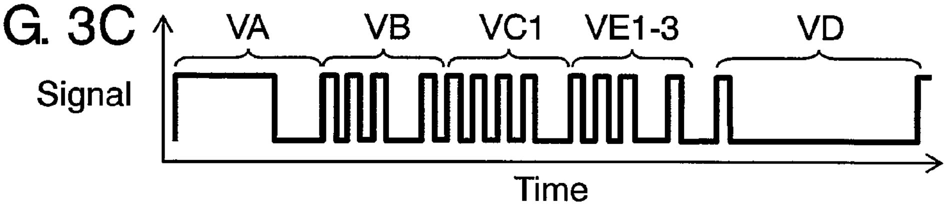
Figure 3D:
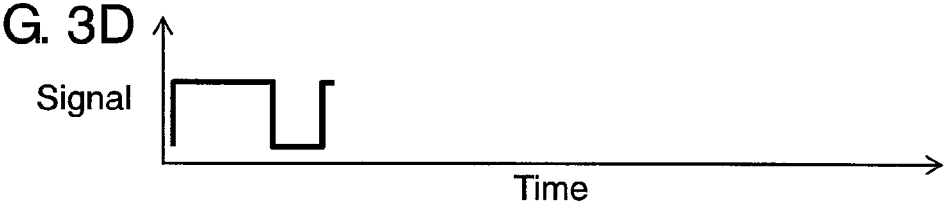
Figure 3E:
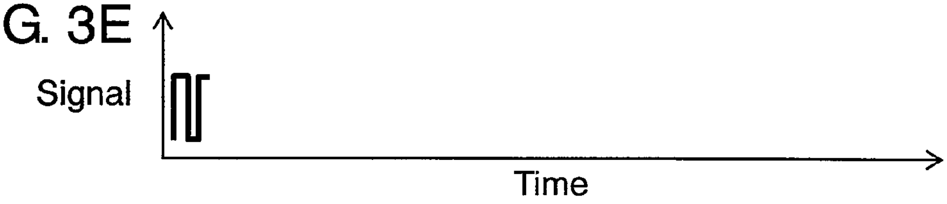
Figure 3F:
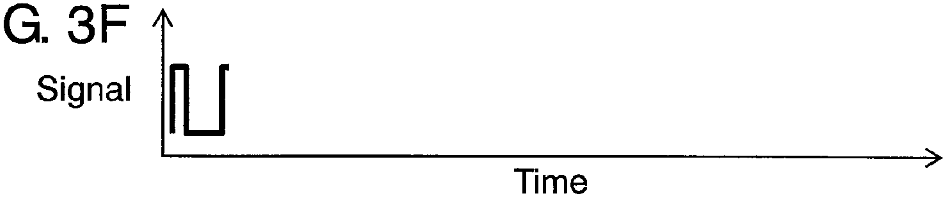
Figure 3G:
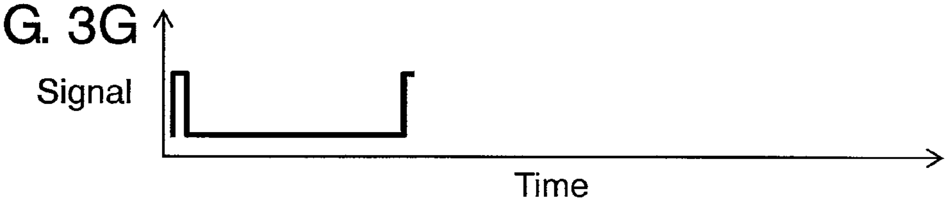

In detail, as shown in a waveform diagram of a transmission code shown in FIG. 3A, transmission codes V1-1, V1-2 and V1-3 of the remote control signal include header data VA shown in FIG. 3D, operation key data VB of "0010" being unique to the pressed operation key and including a combination of "0" in FIG. 3E and "1" in FIG. 3F, remote control identification data VC1 of "0001" for identifying individual remote control transmitters, and stop bit data VD shown in FIG. 3G. In addition to these data, transmission order data VE1-1, VE1-2 and VE1-3 showing the orders of transmission codes V1-1, V1-2 and V1-3 are included. That is to say, the first transmission code V1-1 of the remote control signal shown in signal waveform 2A in FIG. 2 includes code transmission order data VE1-1 of "0001" as shown in FIG. 3A; the second transmission code V1-2 includes transmission order data VE1-2 of "0010" as shown in FIG. 3B; and the third transmission code V1-3 includes transmission order data VE1-3 of "0011" as shown in FIG. 3C. It shows that the transmission order data increase one by one in the binary digit system. In other words, a plurality of transmission codes V1-1, V1-2 and V1-3, which are arranged in a predetermined period X1, include transmission order data VE1-1, VE1-2 and VE1-3 showing the ordinal position of each transmission code, in addition to header data VA, operation key data VB, remote control identification data VC1 and stop bit data VD, which are data common to all the transmission codes. Adding transmission order data makes it possible to determine that V1-1 is transmitted first, V1-2 is transmitted second and V1-3 is transmitted third with intervals of period X1.

On the other hand, when a person having remote control transmitter 12 presses an operation key for answering a question slightly later, as shown in signal waveform 2B of FIG. 2, a remote control signal, in which a plurality of transmission codes V2-1, V2-2 and V2-3 are arranged in period X2 that is larger than period X1, is transmitted from remote control transmitter 12 to receiver 15. A plurality of transmission codes V2-1, V2-2 and V2-3 of remote control transmitter 12, similar to remote control transmitter 11, also include header data VA, operation key data VB and stop bit data VD. Remote control identification data different from those of remote control transmitter 11 are also provided. Furthermore, transmission order data showing the ordinal position of each transmission code are added in the same manner as transmission order data, VE1-1, VE1-2, and VE1-3, of remote control transmitter 11.

Receiver 15 receives two remote control signals from remote control transmitters 11 and 12. Since the first transmission code V1-1 of remote control signal 2A and the first transmission code V2-1 of remote control signal 2B are received almost simultaneously and data are superimposed on each other, receiver 15 cannot decode them. However, when receiver 15 receives the second transmission code V1-2 of remote control signal 2A from remote control transmitter 11 after period X1 and thereafter receives the second transmission code V2-2 of remote control signal 2B after period X2, receiver 15 can receive them separately. Therefore, receiver 15 can decode transmission order data of transmission codes V1-2 and V2-2. Then, receiver 15 decodes that, from these transmission order data, transmission code V1-2 is the second code after period X1 from the transmission starting time of remote control transmitter 11. Similarly, receiver 15 decodes that transmission code V2-2 is the second code after period X2 from the transmission starting time of remote control transmitter 12, and calculates backwards the transmission starting time from the times receiving them and the difference between period X1 and period X2. As a result, receiver 15 compares remote control transmitter 11 with remote control transmitter 12 and judges that remote control transmitter 11 is operated earlier than remote control transmitter 12. Then, for example, in a game, a point is given to a person having remote control transmitter 11.

Figure 4A:
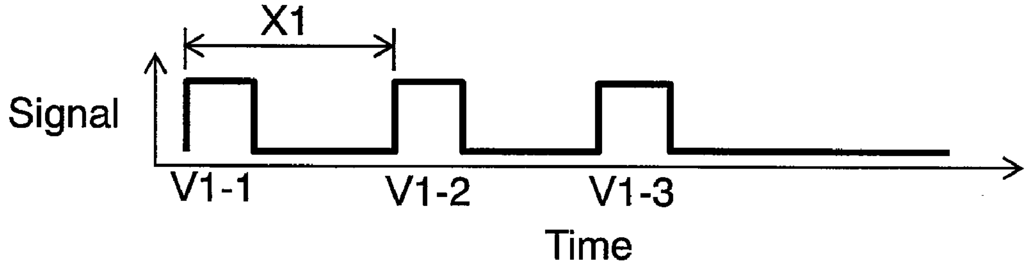
FIGS. 4A and 4B are waveform diagrams of remote control signals of the remote control transmitter of FIG. 1 in the second case.
Figure 4B:
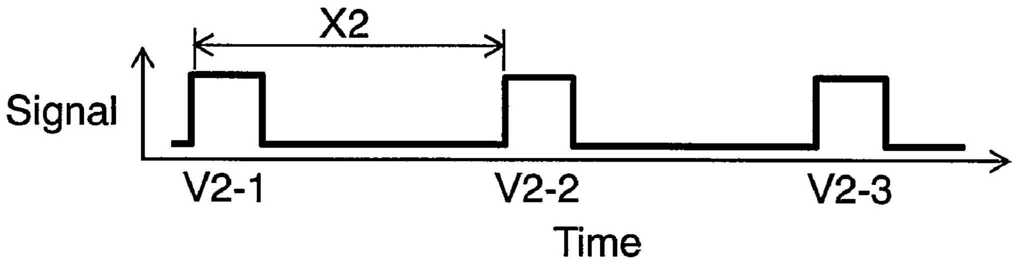

Furthermore, at this time, as the second case, as shown in waveform diagrams of remote control signals of transmitters 11 and 12 in FIGS. 4A and 4B accordingly, when remote control transmitter 11 and remote control transmitter 12 are operated completely simultaneously, similar to the first case, receiver 15 cannot decode the first transmission codes that are superimposed on each other. However, since the transmission periods of remote control transmitter 11 and remote control transmitter 12 are different from each other, receiver 15 can receive and decode second transmission codes V1-2 and V2-2, individually. Receiver 15 decodes transmission order data from second transmission codes V1-2 and V2-2 separately, and calculates backwards the operation starting time from the difference between period X1 and period X2. Then, receiver 15 compares remote control transmitter 11 with remote control transmitter 12 and judges that remote control transmitter 11 and remote control transmitter 12 are operated almost simultaneously. Thus, the operation starting time is judged.

Figure 5:
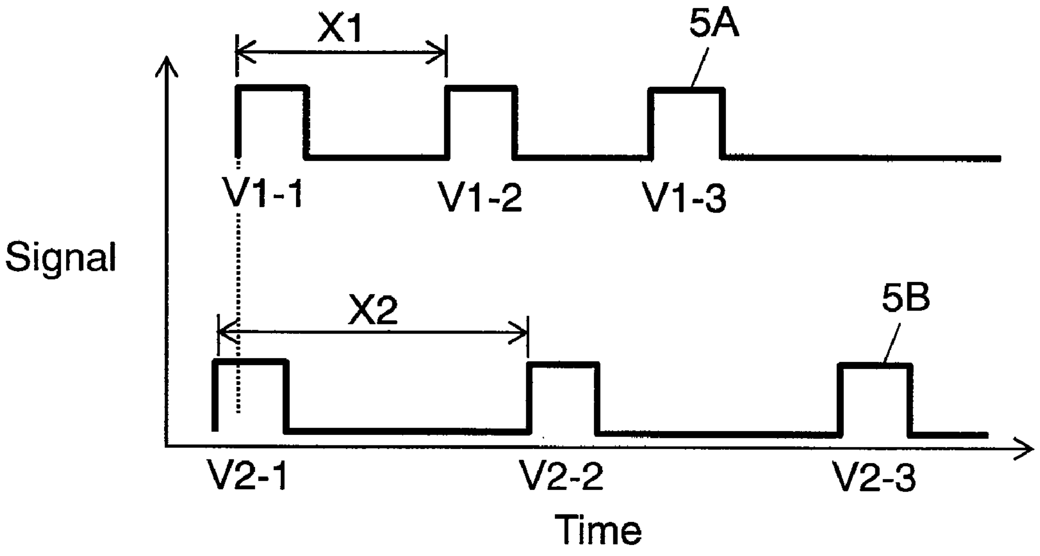
FIG. 5 is a waveform diagram of a remote control signal of the remote control transmitter of FIG. 1 in the third case.
Figure 6:
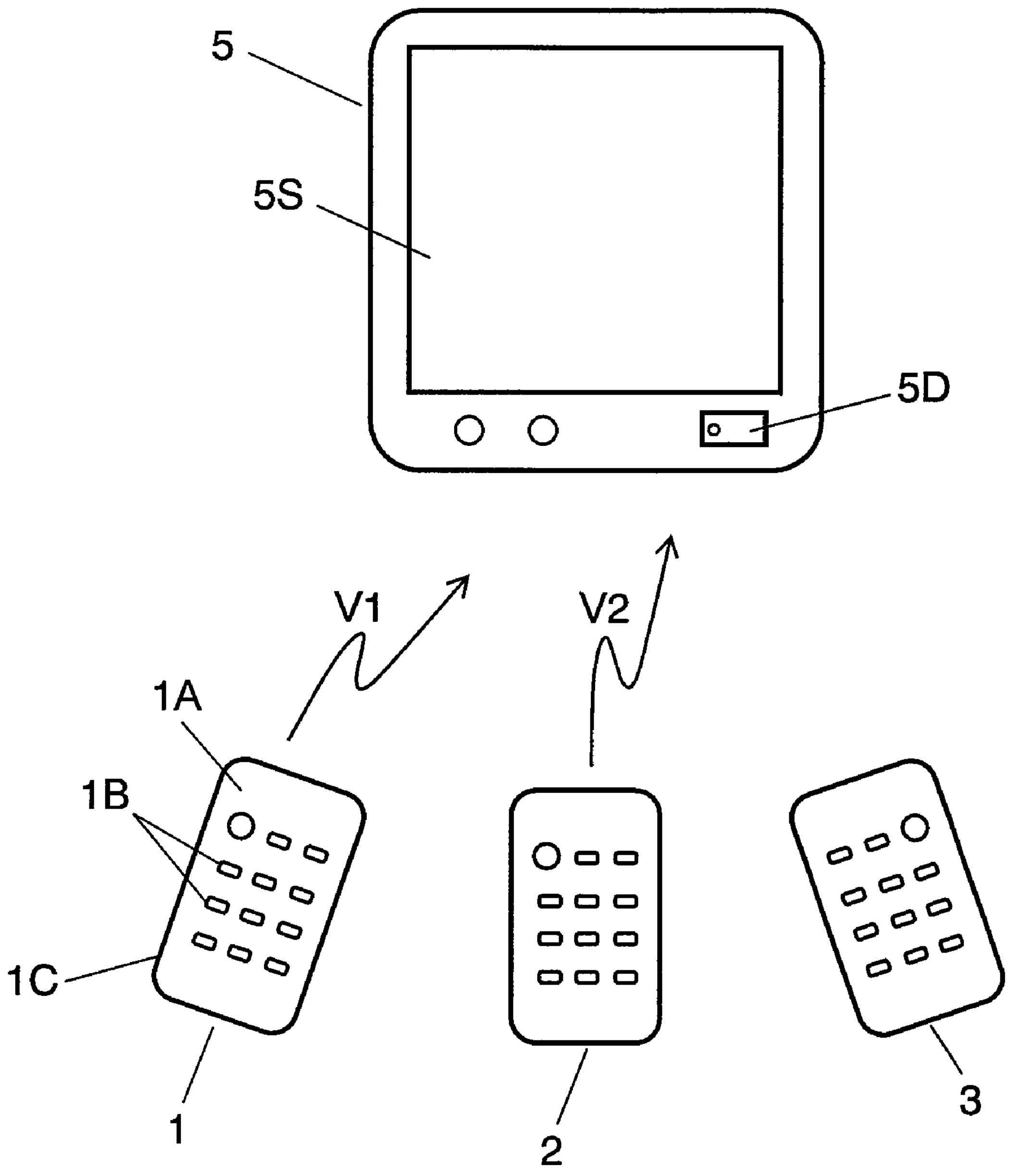
FIG. 6 PRIOR ART
FIG. 6 is an overall view showing a conventional transmitting-receiving system.
Figure 7:
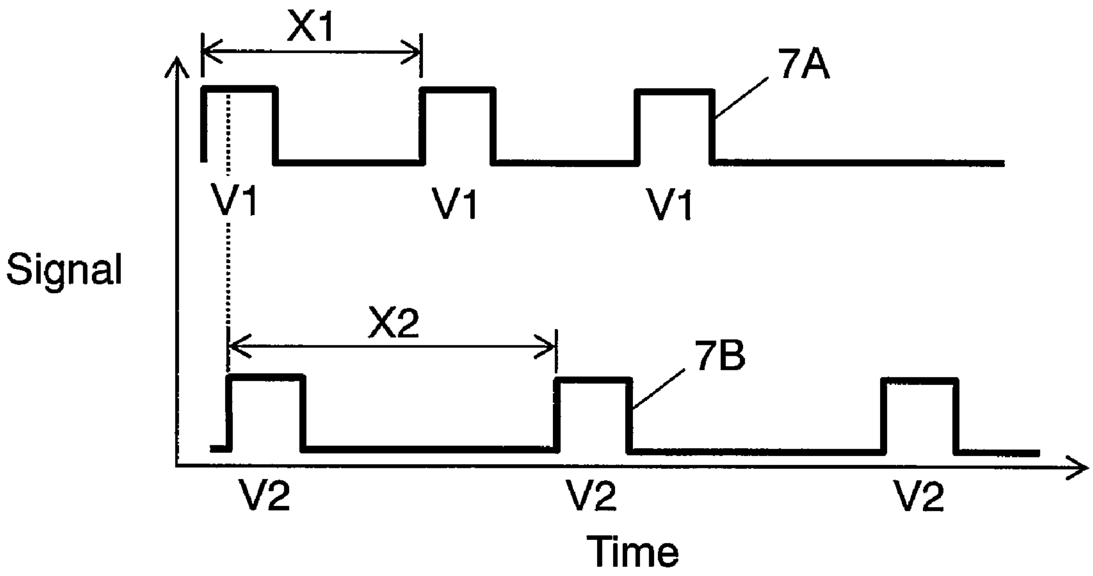
FIG. 7 PRIOR ART
FIG. 7 is a waveform diagram of a remote control signal in the first case of a conventional remote control transmitter.
Figure 8A:
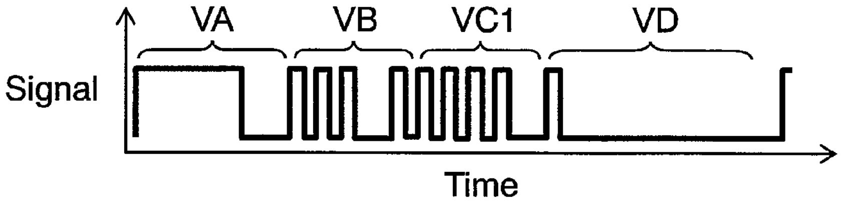
FIG. 8A PRIOR ART
FIGS. 8A to 8E are waveform diagrams of transmission code of a conventional remote control transmitter.
Figure 8B:
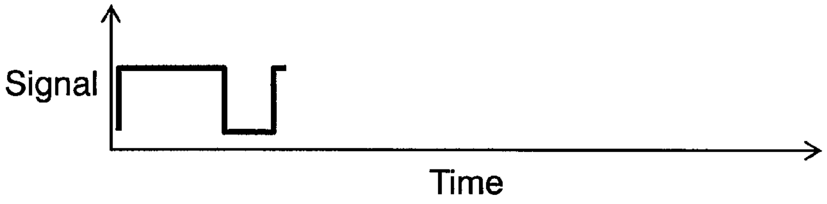
FIG. 8B PRIOR ART
Figure 8C:
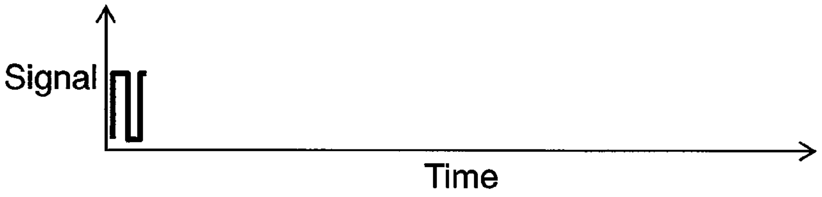
FIG. 8C PRIOR ART
Figure 8D:
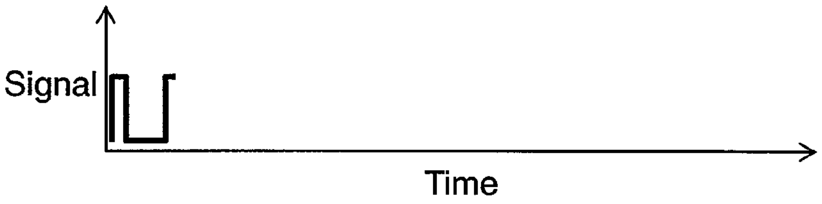
FIG. 8D PRIOR ART
Figure 8E:
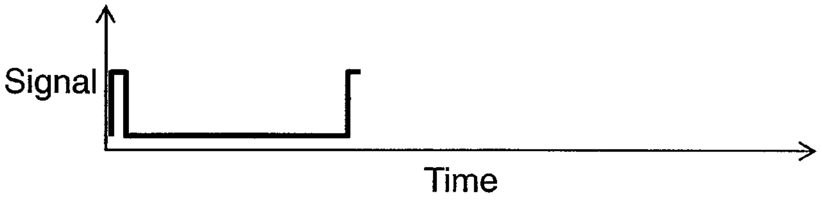
FIG. 8E PRIOR ART
Figure 9:
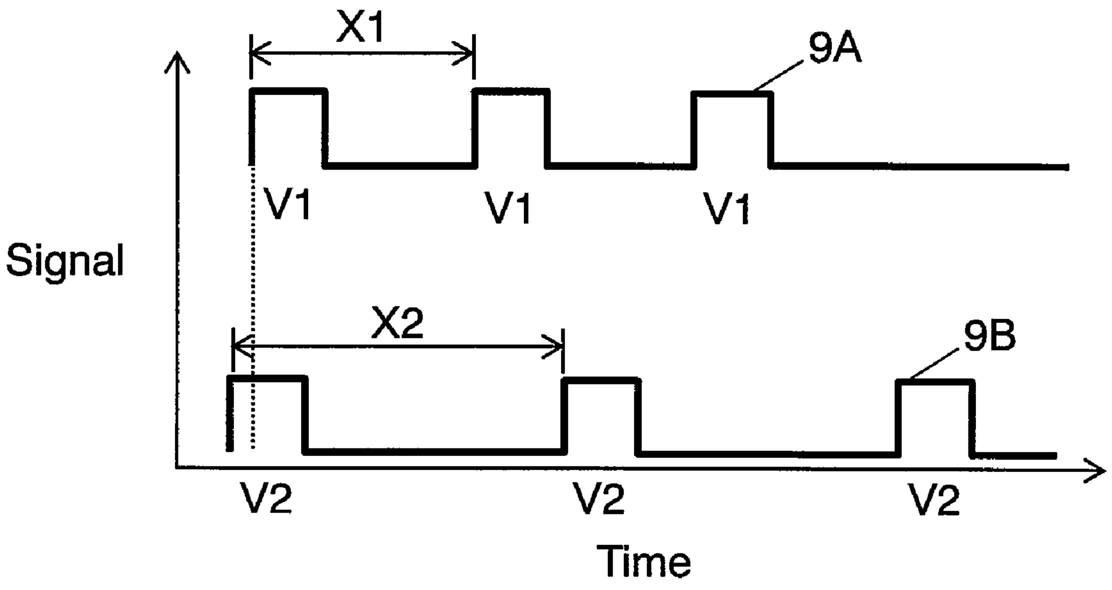
FIG. 9 PRIOR ART
FIG. 9 is a waveform diagram of a remote control signal in the second case of a conventional remote control transmitter.

Furthermore, as the third case, FIG. 5 shows a change over time of a signal waveform when remote control transmitter 12 is operated slightly earlier than remote control transmitter 11. Signal waveform 5A shows a signal of remote control transmitter 11 and signal waveform 5B shows a signal of remote control transmitter 12. Similar to the case described with reference to FIG. 2, the respective first codes V1-1 and V2-1 cannot be decoded by receiver 15 because they are superimposed on each other. Transmission codes that can be decoded by receiver 15 are respective second transmission codes V1-2 and V2-2. Receiver 15 receives second transmission code V2-2 of remote control transmitter 12 later than transmission code V1-2 of remote control transmitter 11. However, from the time receiving each code and the difference between period X1 and period X2, receiver 15 calculates backwards each operation starting time and judges that remote control transmitter 12 is operated earlier than remote control transmitter 11.

More complex case is described next. In this case, remote control transmitter 13 is also operated in addition to remote control transmitters 11 and 12. The remote control signal of remote control transmitter 13 is provided with transmission order data similar to the above cases, and a plurality of transmission codes are set to a period that is different from periods X1 and X2. Thus, receiver 15 can receive and decode a transmission code of each transmitter some time individually. Then, with information on the ordinal position of a transmission code and information on the transmission period unique to each transmitter, the transmission order is judged.

Each of the above-mentioned examples describes a case in which judgment is carried out by comparing the respective second transmission codes with each other. However, the technology is not necessarily limited to the second transmission codes. It is possible to calculate backwards each operation starting time and to make a comparison between any transmission codes in any ordinal positions of any remote control transmitters and any other transmission codes in any other ordinal positions of any other remote control transmitters.

Thus, according to the configuration of this embodiment, a plurality of transmission codes V1-1, V1-2 and V1-3 and transmission codes V2-1, V2-2 and V2-3, and the like, of remote control signals of a plurality of remote control transmitters 11, 12 and 13 are arranged in different periods, and these transmission codes are provided with transmission order data VE1-1, VE1-2, VE1-3, and the like. With this configuration, even if transmission is carried out from a plurality of remote control transmitters completely simultaneously or with a slight time difference, it is possible to judge the transmission operation order of each remote control transmitter accurately. That is to say, a remote control transmitter with little operational misjudgment or malfunction and a transmitting-receiving system using the remote control transmitter can be obtained.

The above-mentioned examples describe cases in which transmission order data increase one by one incrementally. However, any coding can be employed as long as the order of the period can be understood by reading only transmission order data in one period at the side of the receiver. Basically, it is desirable that codes are provided in a way in which they are monotonously increased or decreased according to the period because post-processing operation is simplified.

What is claimed is:

1. A remote control transmitting-receiving system comprising:

a transmitter configured to transmit a signal over a plurality of transmission periods, each transmission period having a predetermined length, wherein the transmitter includes a control unit configured to generate the signal such that the signal comprises:

a plurality of transmission codes, each transmission code transmitted, respectively, over one of the plurality of transmission periods and including a data portion, each data portion including a number indicating the transmission order of the transmission code within the transmitted signal; and a receiver configured to determine a starting time of the transmitted signal by calculating an elapsed time backwards from a time that the transmitted signal is received to the time that the signal was transmitted, wherein the elapsed time is a product of the number indicating the transmission order of the transmission code and the predetermined length of the transmission period.

2. The remote control transmitting-receiving system of claim 1, wherein each numerically changing data portion shows a regular numerical increase.

3. The remote control transmitting-receiving system of claim 2, wherein the numerical increase is an increase of one in each period.

4. The remote control transmitting-receiving system of claim 1, wherein the numerically changing data portion shows a regular numerical decrease.

5. The remote control transmitting-receiving system of claim 4, wherein the numerical decrease is a decrease of one in each period.

6. A remote control transmitting-receiving system comprising:

a plurality of remote control transmitters, each one of the remote control transmitters comprising:

a transmitting unit configured to transmit a signal over a plurality transmission periods, each transmission period having a predetermined length, the predetermined length being different for each one of the plurality of remote control transmitters;

a control unit configured to generate the signal such that the signal comprises:

a plurality of transmission codes, each transmission code transmitted, respectively, over one of the plurality of transmission periods and including a transmission order data portion number indicating the transmission order of the transmission code within the transmitted signal; and a remote control receiver configured to determine a starting time of each transmitted signal by calculating an elapsed time backwards from a time that the transmitted signal is received to the time that the signal was transmitted, wherein the elapsed time is a product of the number indicating the transmission order of the transmission code and the predetermined length of the transmission period.

7. The remote control transmitting-receiving system of claim 6, wherein the transmission order data portion numerically changes regularly in each of the transmission periods for each respective one of the plurality of remote control transmitters.

8. The remote control transmitting-receiving system of claim 1, further comprising:

a plurality of the transmitters transmitting the signal, wherein the predetermined length of the transmission period is different for each respective one of the plurality of transmitters, and wherein the receiver is configured to determine and compare the starting time of the transmitted signal for each of the transmitters.

* * * * *